United States Patent [19]

Nakayama

[11] 3,880,793
[45] Apr. 29, 1975

[54] EMULSIFIERS FOR EMULSION POLYMERIZATION OF VINYL MONOMERS

[75] Inventor: Yasuhara Nakayama, Hiratsuka, Japan

[73] Assignee: Kansai Paint Company Limited, Hyogo, Japan

[22] Filed: Mar. 30, 1972

[21] Appl. No.: 239,733

[52] U.S. Cl.. 260/29.6 RW; 252/356; 260/29.6 BE; 260/29.6 R; 260/29.6 WB; 260/29.7 UA; 260/29.7 UP; 260/29.7 W; 260/95 R
[51] Int. Cl...... B01f 17/52; C08d 3/04; C08d 1/09; C08f 1/13
[58] Field of Search........... 260/29.6 MH, 2.96 XA, 260/29.7 W, 29.7 UP, 78.4 D, 29.7 H, 95 R, 260/29.6 R, 29.6 RW, 29.6 BE, 29.6 WB, 260/29.7 DP; 106/285; 252/356

[56] References Cited
UNITED STATES PATENTS

| | | | |
|---|---|---|---|
| 2,871,137 | 1/1959 | Aldridge et al. | 260/29.7 H |
| 2,933,468 | 4/1960 | Aldridge | 260/78.4 D |
| 3,085,077 | 4/1963 | Floyd | 260/29.7 H |
| 3,249,455 | 5/1966 | Williams | 260/29.7 H |
| 3,365,411 | 1/1968 | Mertzweiller | 260/29.7 W |
| 3,366,563 | 1/1968 | Hart et al. | 260/29.7 H |
| 3,366,588 | 1/1968 | Booth | 260/29.7 H |
| 3,370,027 | 2/1968 | Matt | 260/29.7 H |
| 3,434,989 | 3/1969 | Fantl et al. | 260/29.7 H |
| 3,511,816 | 5/1970 | Dickakian | 260/78.4 D |
| 3,532,663 | 10/1970 | Nicks et al. | 260/34.2 |
| 3,609,110 | 9/1971 | Kumanotani | 260/29.7 H |
| 3,637,565 | 1/1972 | Sheetz | 260/29.7 H |
| 3,654,203 | 4/1972 | Daimer et al. | 260/29.7 H |
| 3,689,446 | 9/1972 | Furuya et al. | 260/29.7 H |

OTHER PUBLICATIONS

Alfrey et al., High Polymers, Vol. VIII, pp. 81–83, (Interscience, 1952) [QD 281 P6A5c]
Blackley, High Polymer Lactices, Vol. 1, pp. 268–274, (Applied Science Pub. Ltd., London, 1966) [TS1890 B54]

*Primary Examiner*—Melvin Goldstein
*Assistant Examiner*—T. DeBenedictis, Sr.
*Attorney, Agent, or Firm*—Larson, Taylor and Hinds

[57] ABSTRACT

An emulsifier for emulsion polymerization of a vinyl monomer comprises an addition product, neutralized with a base, of a butadiene polymer having a number average molecular weight of 200 to 40,000 and at least one of maleic acid and maleic anhydride, said addition product having an acid value of 20 to 350; and a method for polymerizing a vinyl monomer in an aqueous medium, characterized in that the above emulsifier is used for the polymerization.

2 Claims, No Drawings

EMULSIFIERS FOR EMULSION POLYMERIZATION OF VINYL MONOMERS

This invention relates to an emulsifier for emulsion polymerization of vinyl monomers, more particularly to a high molecular weight emulsifying agent for emulsion polymerization of vinyl monomers and a method for polymerizing vinyl monomers in aqueous medium in the presence of said emulsifying agent to produce vinyl polymer emulsions. Further the present invention pertains to aqueous emulsion of vinyl polymers useful as a vehicle for paints, adhesive, etc.

In general, emulsion polymerization of vinyl monomers has mainly been conducted using an emulsifying agent of a low molecular weight. When the polymer emulsion obtained by the above method is employed as a coating composition, however, the coating film obtained therefrom will be poor in water resistance. It has been proposed, on the other hand, to carry out the emulsion polymerization of vinyl monomers in the presence of a high molecular weight emulsifying agent having a hydrophilic side chain bonded ton an oleophilic main chain, such as polyacrylic acid, polymethacrylic acid, polyvinyl pryidine, etc. However, no report has been made yet as to the use of the resultant emulsion as a coating composition and as to the characteristics of the coating film obtained therefrom.

An object of the invention is to provide a novel kind of a high molecular weight emulsifying agent for emulsion polymerization of vinyl monomers.

Another object of the invention is to provide a method for emulsion polymerization of vinyl monomers using a high molecular weight emulsifying agent, the resultant polymer emulsion thereby obtained being useful as vehicles for paints, adhesives and compositions for resin treatment.

Another object of the invention is to provide an aqueous emulsion of vinyl polymers capable of producing a coating film having a high order of hardness, water resistance and mechanical strengths with a smooth continuous surface.

These and other objects and advantages of the invention will be apparent from the following description.

The emulsifier of the present invention comprises an addition product, neutralized with a base, of a butadiene polymer having a number average molecular weight of 200 to 40,000 and at least one of maleic acid and maleic anhydride, said addition product having an acid value of 20 to 350.

According to the researches of the present inventors it has been found that the above specific emulsifying agent, i.e., maleinized butadiene polymer, can be employed efficiently for emulsion polymerization of a certain kind of vinyl monomers and that the aqueous emulsion of vinyl polymers obtained by using the above emulsifier of the invention can be effectively used as a vehicle for paint to produce a glossy coating film having a high order of hardness, water resistance and mechanical strengths with a smooth continuous surface free from undesired tackiness. The reason why such an excellent coating film can be produced from the polymer emulsion obtained by using the above emulsifier of the present invention is attributable to the fact that the molecules of the maleinized butadiene polymer used as an emulsifier and contained in the resultant aqueous emulsion of vinyl polymers will react with each other to form a three-dimensional network structure during film forming step. Further, the polymer emulsion is so excellent in pigment dispersibility that the pigment used never separates therefrom during film-forming step, making it possible to obtain a coating film having excellent gloss. The polymer emulsion obtained by the present invention is, further, useful as an adhesive and composition for resin treatment.

The butadiene polymer used as a starting material for producing the emulsifier of the invention includes homopolymers of butadiene, copolymers of butadiene with other copolymerizable monomers and modified products of these homopolymers and copolymers. The homopolymer of butadiene polymer can have any structure of 1,2-vinyl bond, trans 1,4-bond, cis 1,4-bond and mixture thereof. Particularly, polybutadiene containing more than 30% of 1,2-vinyl bond is preferable. When an emulsion polymerization is carried out using the emulsifying agent of the invention obtained by maleinization of a polybutadiene containing such a large amount of 1,2-vinyl bond, graft polymerization of the vinyl monomer with the maleinized butadiene polymer occurs effectively during the polymerization step, whereby the coating film obtained from the resultant polymer emulsion can be cured sufficiently without using curing agent to produce a cured film having higher order of water resistance.

The copolymers of butadiene are those containing at least 10 wt.%, preferably at least 40 wt.% of butadiene. The monomers to be copolymerized with butadiene include, for example, olefins having 2 to 6 carbon atoms; dienes such as isoprene, chloroprene, cyclopentadiene, etc.; acrylic acid, methacrylic acid and alkyl ($C_1$ to $C_{16}$) esters thereof; styrene compounds such as styrene, α-methyl styrene, vinyl toluene, etc.; and acrylonitrile and methacrylonitrile.

The modified products of the homopolymer and copolymer of butadiene include, for example, partially hydrogenated butadiene polymers, cyclized butadiene polymers, hydroxyl butadiene polymers and epoxidized butadiene polymers. It is preferable that the modified butadiene polymer retains more than 60% of the double bond contained in the original butadiene polymer.

The butadiene polymers used in the invention are those having a number average molecular weight of 200 to 40,000. When the number average molecular weight thereof is less than 200, the emulsifying agent obtained therefrom fails to produce a vinyl polymer emulsion having a good storage stability and capable of producing a coating film having excellent properties. In the case of the butadiene polymers having a number average molecular weight of more than 40,000, the viscosity thereof is too high to effect the subsequent maleinization reaction. Preferable number average molecular weight of the butadiene polymer is in the range of 500 to 10,000.

In the invention the butadiene polymer is maleinized with maleic acid and/or anhydride thereof to produce the emulsifier of the invention, i.e., an addition product of both compounds. The amount of maleic acid or anhydride thereof used may vary over a wide range in accordance with a kind of butadiene polymer, but it is necessary to use maleic acid or anhydride thereof in an amount sufficient to produce a maleinized butadiene polymer having an acid value ranging from 20 to 350. Usually such amount is in the range of 1.7 to 200 weight parts, preferably 3.5 to 100 weight parts, based on 100 weight parts of the butadiene polymer. The maleinization reaction can be carried out with stirring in an inert gas atmosphere, using an organic solvent, if desired. Examples of the solvents are aromatic hydrocarbons such as benzene, toluene, xylene, etc., ketones such as acetone, methyl ethyl ketone, methyl isobutyl ketone, etc., esters such as ethyl acetate, methyl acetate, butyl acetate, etc., ethers such as dioxane, tetrahydrofuran, dipropyl ether, etc. Preferable reaction temperature is in the range of 150° to 250°C. The reaction usually is completed within 0.5 to 48 hours.

The addition product of butadiene polymer and maleic anhydride is then subjected to a ring-opening reaction conventional in the art, using water, alcohols or amines. The use of water results in dicarboxylic acid compounds, alcohols in half estters and amines in half amides. Alcohols used are, for example, aliphatic monohydric alcohols having 1 to 18 carbon atoms, ethylene glycol, propylene glycol, polyethylene glycol having a molecular weight of not more than 1500 and polypropylene glycol having a molecular weight of not more than 2000, and amines used include, for example, methyl amine, ethyl amine, dimethyl amine and diethyl amine.

The acid value of the resultant addition product should be in the range of 20 to 350. The addition product having a low acid value less than 20 fails to display sufficient effect as an emulsifier, while that of a high acid value more than 350 results in the production of a coating film having poor water resistance. Preferable acid value thereof is in the range of 20 to 200.

The addition product is neutralized with a base to produce emulsifying agent of the invention. The base used includes, for example, ammonia, alkali metal hydroxides, alkali metal oxides, alkali metal carbonates, alkali metal bicarbonates, and amines such as methyl amine, ethyl amine, propyl amine, butyl amine, stearyl amine, methanol amine and like primary amines, dimethyl amine, diethyl amine, methyl ethyl amine, diethanol amine and like secondary amines, and trimethyl amine, triethyl amine, triethanol amine, morphorine and like tertiary amines.

In the invention the addition product neutralized with a base is useful as an emulsifying agent for emulsion polymerization of hydrophobic vinyl monomers having a Q value of at least 0.1 determined by Q—e scheme. The Q—e scheme is a theory representing an addition reaction velocity constant of a monomer with a radical, formulated by Alfrey and Price in 1947, and "Q value" is a constant showing the general reactivity of the monomer in question and increases as reactivity of the monomer with a radical becomes higher. Representatives of such vinyl monomers have a structural formula of $$CH_2=CCOOR_2,$$
$$\phantom{CH_2=C}R_1$$

wherein $R_1$ is hydrogen or methyl and $R_2$ is an alkyl of 1 to 18 carbon atoms. Examples of the vinyl monomers are alkyl esters of acrylic or methacrylic acid, glycidyl acrylate, glycidyl methacrylate, methoxybutyl acrylate, methoxybutyl methacrylate, methoxyethyl acrylate, methoxyethyl methacrylate, ethoxybutyl acrylate, ethoxybutyl methacrylate, allyl acrylate, allyl methacrylate, hydroxypropyl methacrylate, diethylaminoethyl methacrylate, allyloxyethyl acrylate, allyloxyethyl methacrylate, styrene, α-methyl styrene, vinyl toluene, vinyl pyridine, butadiene, isoprene, chloroprene, acrylonitrile, methacrylonitrile, etc. Preferable examples of the vinyl monomers are alkyl ($C_2$ to $C_8$) esters of acrylic or methacrylic acid and styrene. These vinyl monomers can be used alone or in admixture with one another. When vinyl monomer, such as vinyl acetate, having a Q value of less than 0.1 is subjected to emulsion polymerization using the present emulsifier, the polymerization reaction of the vinyl monomers can not proceed effectively, since the radical produced from the monomer is so active to easily react with maleinized butadiene polymer used as an emulsifier.

It is possible in the invention to copolymerize the hydrophobic vinyl monomers having a Q value of at least 0.1 with lower than 10 wt.%, based on the above vinyl monomer, of water-soluble or hydrophilic other vinyl monomers. The examples of the latter are, for example, acrylic acid, methacrylic acid, itaconic acid, acrylamide, N-methyl acrylamide, N-ethylacrylamide, methacryl amide, dimethylaminoethyl methacrylate, N-methylol acrylamide, N-methylol methacrylamide, N-methylol acrylamide butyl ether, 2-hydroxyethyl acrylate, 2-hydroxyethyl methacrylate, 2-hydroxypropyl acrylate, 2-hydroxypropyl methacrylate, acrolein, etc.

In the invention the vinyl monomer is polymerized in an aqueous medium in the presence of the maleinized butadiene polymer emulsifier. Such emulsifier is used in such an amount that theoretical acid value relative to the total solids contained in the resultant vinly polymer emulsion will be in the range of 5 to 150. "Theoretical acid value relative to the total solid" is determined by the following equation:

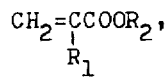

wherein A is acid value of maleinized butadiene polymer used, B is total weight in grams of maleinized butadiene polymer and vinyl monomers charged to the polymerization system and C is weight in grams of maleinized butadiene polymer charged to the polymerization system. When the amount of emulsifier is too small to achieve the above theoretical acid value of less than 5, emulsion polymerization can not proceed effectively. When the amount is so large as to give the theoretical acid value of over 150, the coating film obtained from the resultant polymer emulsion will tend to exhibit poor water resistance. Preferable amount of maleinized butadiene polymer emulsifier used is such an amount that the theoretical acid value relative to the total solids in the resultant polymer emulsion will be in the range of 15 to 120.

The emulsion polymerization of the vinyl monomers can be conducted under the same conditions as in the conventional emulsion polymerization thereof. For example, emulsion polymerization can be conducted in an aqueous medium in the absence or presence of a radical initiator or under irradiation of radiations. The polymerization is carried out at a temperature higher than freezing point of water but lower than boiling point of water under the reaction conditions. Stirring is preferable for the polymerization reaction, but it is possible to carry out the polymerization reaction without stirring when vinyl monomer is emulsified in aqueous medium prior to the polymerization reaction. Initiators to be used are, for example, organic or inorganic peroxides, sulfides, sulfines, sulfinic acids, sulfones, azo compounds, diazo compounds, nitroso compounds, persulfates, perchlorates, water- or oil-soluble Redox initiators, etc. Besides, there may be used actinic light, photosensitizer, electric radiation, γ-rays, x-rays, ultrasonic waves, etc. singly or in combination with the above organic or inorganic initiators.

To the polymer emulsion obtained in accordance with the present invention can be added various additives in accordance with the use of the emulsion. For example, when the emulsion is used as a vehicle for paint, pigments, plasticizers, extenders, dispersants, coalesing agents, other water-soluble polymers, etc. can be added to the emulsion. Further the polymer emulsion is also useful as adhesives, resin treating compositions, etc., and in such a case plasticizers, coalesing agents, extenders, other vinyl monomers and the like can be added thereto, as required.

When the polymer emulsion is used as a vehicle for paint, the resultant paint can be applied to various substrates by conventional coating methods, such as spray coating, brush coating, roll coating, etc. The coated film can be cured at room temperature or elevated temperatures.

Reference Example 1

150 g of polybutadiene having a number average molecular weight of 1900 and consisting of 72% pf cis 1,4-bond, 27% of trans 1,4-bond and 1% of 1,2-vinyl-bond (hereinafter referred to as polybutadiene A), 20 g of maleic anhydride and 75 ml of xylene were placed into an autoclave and reacted in a nitrogen gas atmosphere by heating at 190 to 200°C for 5 hours with vigorous stirring.

After reaction, the resulting product was thoroughly washed with water. 60 ml of butyl cellosolve was then added to the product and water was removed therefrom by an evaporator to obtain maleinized polybutadiene solution. The resultant maleinized polybutadiene had an acid value of 93 and the solution thereof had a concentration of 85.6 wt.%.

Reference Examples 2 to 10

Predetermined amounts of polybutadiene A, maleic anhydride and xylene were reacted at a given temperature for a given period of time to produce maleinized polybutadiene in the same manner as in Reference Example 1. The amounts of the compounds, reaction conditions and properties of the resulting products are shown in Table 1.

Products of Reference Examples 2, 3, 5, 9 and 10 in Table 1 were obtained in the following manner. In Reference Example 8, methyl isobutylketone was used in place of xylene. In Reference Examples 2, 3 and 9:

After the reaction, methanol was added to the product and the mixture was left to stand for 2 days to produce half ester. To the product thoroughly washed with methanol was added butyl cellosolve and methanol was removed from the resulting mixture by an evaporator.

In Reference Example 5:

After the reaction, an excess amount of diethylamine was added to the product and the mixture was dissolved in methanol. The solution was then added to acetone to cause precipitation and the precipitate was separated and taken out. Ethyl cellosolve was added to the separated product. Acetone and methanol were removed from the mixture by an evaporator. To determine the acid value of the product, a portion of the sample was taken out after reaction and added to methanol for precipitation. The product thus purified was used for the determination.

In Reference Example 10:

After the reaction, the product was precipitated in methanol and the supernatant liquid was removed. 80 ml of butyl cellosolve was added to the precipitate and methanol was removed from the mixture by an evaporator.

Reference Example 11

In the same manner as in Reference Example 1, 150 g of polybutadiene A, 15 g of maleic anhydride and 75 ml of xylene were reacted at 175° to 185°C for 4 hours and then cooled. The product was thoroughly washed with water and residual water was removed by an evaporator. The resulting maleinized butadiene polymer had an acid value of 89.6 and was free from water.

Reference Example 12

In the same manner as in Reference Example 1, 100 g of polybutadiene A, 30 g of maleic anhydride and 50 ml of xylene were reacted at 170° to 190°C for 4 hours and then cooled. The resulting product was washed with water and then with methanol. A small amount of water was further added to the product, this being followed by removal of methanol by an evaporator. The maleinized butadiene polymer obtained had an acid value of 140. This mixture contained 15.3 wt.% of water.

Table 1

| Reference Example Nos. | | 2 | 3 | 4 | 5 | 6 | 7 | 8 | 9 | 10 |
|---|---|---|---|---|---|---|---|---|---|---|
| Starting compounds | Polybutadiene A (g) | 150 | 150 | 150 | 150 | 150 | 100 | 50 | 50 | 200 |
| | Maleic anhydride (g) | 30 | 45 | 12 | 30 | 30 | 30 | 50 | 15 | 60 |
| | Xylene (ml) | 75 | 75 | 75 | 75 | 75 | 50 | 50* | 25 | 100 |
| Reaction conditions | Heating temperature (°C) | 170-185 | 180-190 | 180-190 | 173-186 | 170-185 | 170-185 | 170-180 | 175-185 | 180-185 |
| | Heating time (hr) | 5 | 4 | 5 | 5 | 4 | 4 | 5 | 5 | 4.5 |
| | Solvent used / Methyl cellosolve (ml) | — | — | — | 50 | — | — | — | — | — |
| | Solvent used / Butyl cellosolve (ml) | 50 | 60 | 60 | — | 60 | 40 | 40 | 20 | 80 |
| Properties | Acid value | 76 | 116 | 49 | 76 | 111 | 144 | 310 | 115 | 121 |
| | Concentration (wt. %) | 76.3 | 76.4 | 83.5 | 75.0 | 86.0 | 83.5 | 61.0 | 82.0 | 76.0 |

*A methyl isobutylketone used in place of Xylene

Reference Examples 13 to 15

In the same manner as in Reference Example 1, maleinized butadiene polymer was prepared. The amounts of starting compounds, reaction conditions and properties of the reaction product are given in Table 2.

In Reference Example 14 in Table 2, the treatment after the reaction was conducted as follows. After cooling, 50 ml of glycerine was added to the product and the mixture was left to stand overnight to produce half ester. The resulting product was washed with methanol and butyl cellosolve was then added to the washed product, this being followed by removal of methanol by an evaporator.

The polybutadienes B and C listed in Table 2 were:
Polybutadiene B: Polybutadiene having a number average molecular weight of 3000 to 4000 and consisting of 82.2% of cis 1,4-bond, 15.4% of trans 1,4-bond and 2.4% 1,2-vinyl-bond.
Polybutadiene C: Polybutadiene having a number average molecular weight of 1300 and consisting of 50% cis 1,4-bond, 48% of trans 1,4-bond and 2% of 1,2-vinyl-bond.

Reference Example 16

The maleinized butadiene polymer solution obtained in Reference Example 3 was washed with water and with methanol three times respectively. The washed solution was then left to stand in water for 3 days to completely release water-soluble components into water and the water was discarded. The resulting maleinized butadiene polymer is a mixture of 6.10 wt.% of water and 39.0 wt.% of maleinized polybutadiene (solid).

Reference Example 17

30 g of maleinized butadiene polymer solution prepared in Reference Example 6 was precipitated in methanol to remove butyl cellosolve. The resulting substance was washed with water and methanol three times respectively and was further thoroughly washed with methanol. After removing the supernatant liquid, the remaining substance was dried for 2 hours under a reduced pressure. The resulting product is a mixture of about 50 wt.% of methanol and about 50 wt.% of maleinized polybutadiene (solid).

Reference Example 18

50 g of polybutadiene A, 25 g of maleic acid and 25 ml of xylene were pleaced into an autoclave, which was then sealed. In the same manner as in Reference Example 1, the mixture was heated at 190° to 225°C for 5 hours under vigorous stirring for reaction. To the product thoroughly washed with water and methanol was added 40 ml of butyl cellosolve. An evaporator was used to remove water and methanol. The resulting substance was precipitated in water again and thoroughly washed and left to stand in water for 1 day. Water was removed to obtain a mixture of maleinized butadiene polymer and water. The maleinized butadiene polymer was a mixture of 54.7 wt.% of water and 45.3 wt.% of maleinized polybutadiene (solid) and had an acid value of 120.

Reference Example 19

250 g of polybutadiene D (having a number average molecular weight of 1420, with terminal carboxyl group having an acid value of 66.3 and consisting 10.2% of trans 1,4-bond and 89.8% of 1,2-vinyl bond), 50 g of maleic anhydride, 60 ml of methyl isobutylketone and 150 ml of xylene were placed in an autoclave and reacted in a nitrogen gas atmosphere by heating at 180° to 190°C for 4 hours with vigorous stirring. After the reaction, the resulting product was washed with water and then with methanol. 100 ml of butyl cellosolve was added to the washed product, this being followed by removel of methanol by an evaporator to obtain maleinized butadiene polymer solution. The maleinized butadiene polymer had an acid value of 89 and concentration of 77.4 wt.%.

Reference Examples 20 to 23

In the same manner as in Reference Example 19, maleinized butadiene polymer prepared. The amounts of the starting compounds, reaction conditions and properties of the products are given in Table 3.

Table 2

| Reference Example Nos. | | 13 | 14 | 15 |
|---|---|---|---|---|
| Starting compounds | Polybutadiene A (g) | — | 50 | — |
| | Polybutadiene B (g) | — | — | 100 |
| | Polybutadiene C (g) | 50 | — | — |
| | Maleic anhydride (g) | 15 | 50 | 50 |
| | Xylene (ml) | 25 | 25 | 50 |
| | Methyl isobutyl-ketone (ml) | — | 25 | 20 |
| Reaction conditions | Heating temperature (°C) | 175–180 | 173–180 | 175–180 |
| | Heating time (hrs) | 4 | 3 | 3 |
| | Solvent used (butyl cellosolve, ml) | 20 | 20 | 40 |
| Properties | Acid value | 155 | 172 | 152 |
| | Concentration (wt. %) | 87.3 | 76.5 | 79.2 |

Table 3

| Reference Example Nos. | | 20 | 21 | 22 | 23 |
|---|---|---|---|---|---|
| Starting compounds | Polybutadiene D (g) | 250 | — | — | — |
| | Polybutadiene E (g) | — | 50 | — | — |
| | Polybutadiene F (g) | — | — | 125 | — |
| | Polybutadiene G (g) | — | — | — | 300 |
| | Maleic anhydride (g) | 75 | 50 | 50 | 180 |
| | Xylene (ml) | 180 | — | 80 | 200 |
| | Methyl isobutyl-ketone (ml) | 70 | 50 | 50 | 150 |
| Reaction conditions | Heating Temperature (°C) | 190–200 | 175–185 | 175–185 | 185–195 |
| | Heating time (hrs) | 5 | 4 | 4 | 4.5 |
| | Solvent used (butyl cellosolve, ml) | 100 | 40 | 50 | 120 |
| Properties | Acid value | 151 | 283 | 162 | 190 |
| | Concentration (wt. %) | 81 | 59 | 92 | 83 |

Polybutadiene E, F and G in Table 3 were: Polybutadiene E: Polybutadiene having a number average molecular weight of 1150 and consisting of 8.7% of trans 1,4-bond and 91.3% of 1,2-vinyl bond. Polybutadiene F: Polybutadiene having a number average molecular weight of 500 to 1000 with phenyl end group and consisting of 10% of cis 1,4-bond, 45% of trans 1,4-bond and 45% of 1,2-vinyl bond.

Polybutadiene G: Polybutadiene having a number average molecular weight of 1100 and consisting of 89.2% of 1,2-vinyl bond and 10.8% of trans 1,4-bond.

Reference Example 24

200 g of polybutadiene H (having a number average molecular weight of 4040 and consisting of 8% of cis 1,4-bond and 92% of 1,2-vinyl bond), 80 g of maleic anhydride, 100 ml of methyl isobutylketone and 150 ml of xylene were placed in an autoclave and reacted in a nitrogen gas atomosphere by heating at 185° to 195°C for 5 hours with vigorous stirring. After the reaction, the product was divided into two equal portions. One portion was thoroughly washed with water and then precipitated in methanol. The other portion was directly precipitated in methanol. 40 ml of butyl cellosolve was added to both portions respectively, this being followed by removal of methanol with an evaporator to obtain maleinized polybutadiene solutions. The former was designated as Reference Example 24 - 1, with the latter as Reference Example 24-2. The product of Reference Example 24 — 1 had an acid value of 130 and solution concentration of 74 wt.%, while that of Reference Example 24 - 2 had an acid value of 86 and solution concentration of 80 wt.%.

Reference Example 25

100 g of styrene-butadiene copolymer (having a number average molecular weight of 2000 to 2400 and containing 80% of butadiene polymer and 70% of 1,2-vinyl bond), 100 g of maleic anhydride, 100 ml of methyl isobutylketone and 150 ml of xylene were placed in an autoclave and reacted in a nitrogen gas stream by heating at 175° to 190°C for 7 hours with vigorous stirring. After the reaction, the product was thoroughly washed with water and then precipitated in methanol. The supernatant liquid was removed and 40 ml of butyl cellosolve was added to the remaining substance. By removing methanol therefrom with an evaporator, a solution of maleinized butadiene copolymer was obtained. The copolymer had an acid value of 162 and concentration of 89.5 wt.%.

Reference Example 26

200 g of isobutylene-butadiene copolymer (having a number average molecular weight of 450 to 500, 3 to 4 unsaturated bonds per molecule and an iodine value of 150 to 180), 200 g of maleic anhydride, 100 ml of methyl isobutylketone and 150 ml of xylene were placed in an autoclave and reacted in a nitrogen gas atomosphere by heating at 180° to 190°C for 7 hours with vigorous stirring. After the reaction, the product was thoroughly washed with water. 80 ml of butyl cellosolve was then added to the washed product. By removing water therefrom with an evaporator, a solution of maleinized butadiene copolymer was obtained. The copolymer had an acid value of 116 and concentration of 87.2 wt.%.

Reference Example 27

Partially cyclized polybutadiene having a molecular weight of 1000 to 1500 and represented by the formula

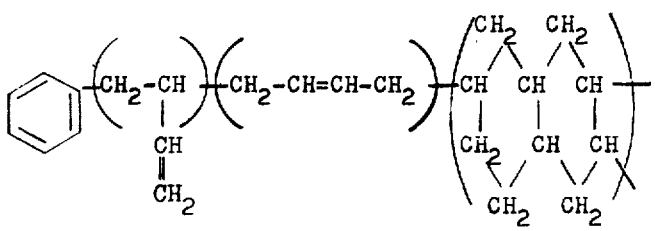

1 : 6 : 15 : 25 was thoroughly washed with 20 wt.% NaOH aqueous solution for a day in a nitrogen gas atomosphere and further washed with water and methanol. The polybutadiene was then dried.

200 g of this substance, 200 g of maleic anhydride, 200 ml of methyl isobutylketone and 300 ml of xylene were placed in an autoclave and reacted in a nitrogen gas atomosphere by heating at 185° to 195°C for 5 hours with vigorous stirring. After the reaction, the product was thoroughly washed with water. 80 ml of butyl cellosolve was added to the washed product. By removing methanol therefrom with an evaporator, a solution of maleinized butadiene polymer was obtained. The polymer had an acid value of 193 and concentration of 81.7 wt.%.

EXAMPLE 1

In 71.5 g of butyl methacrylate were dissolved 0.5 of cobalt naphthenate and 2.0 g of lead naphthenate. In an autoclave the resultant solution was placed in combination with 40 g of maleinized polybutadiene obtained in Reference Example 1, 10 ml of 28% ammonia water, 100 ml of water and 200 mg of ammonium persulfate. The air in the autoclave was replaced with nitrogen gas by repeating the procedures of pressure reduction and nitrogen gas replacement alternately for 30 minutes. Thereafter the mixture was heated with stirring at 75° to 85°C for 2 hours, whereby polymer emulsion having 47.8% solid content was obtained. The particle size of the polymer in the emulsion was 0.14 to 0.18 μ and theoretical acid value of the product was 30.0, on the assumption that butyl methacrylate was completely polymerized.

The resultant polymer emulsion was applied to a glass plate and dried at room temperature, whereby transparent and hard coating was obtained. The coating displayed such excellent water resistance that after being cured at room temperature for a day it showed no change in 3 hours' water drop test.

The particle size measurement and water drop test were carried out in the following manner:

Particle size

Visible rays of a wave length of 430 μ and 700 μ was irradiated to the polymer emulsion to be tested to measure turbidity, and particle size was determined therefrom by Sakurada et al's method disclosed in Bull. Inst. Chem Research (Kyoto Univ.) 42 (2 – 3) 145 (1964).

Water drop test

Polymer emulsion was applied to a glass plate and dried to produce a cured coating film. On the coating film was placed water drop at room temperature to observe the changes of the film.

EXAMPLES 2 – 9

Polymer emulsions were prepared in the same manner as in Example 1 except that polymerization was conducted under the conditions shown in Table 4 below.

Each polymer emulsion obtained in Examples 2 to 9 was applied to a glass plate and cured at room temperature, whereby transparent and hard coating film was obtained. The coatings obtained from the emulsions of Examples 2, 4, 6, 7, 8 and 9 were subjected to water drop test one day after coating, but no change was observed on respective coatings in 3 hours' test. Further the coatings obtained from the emulsions of Examples 3 and 5 were subjected to the same test 2 days and 7 days after coating respectively, no change was observed on the coatings in 3 hours' test.

EXAMPLES 10 TO 20

Polymer emulsions were prepared in the same manner as in Example 1 except that polymerization was conducted under the conditions shown in Table 5 below.

Table 4

| | Example Nos. | 2 | 3 | 4 | 5 | 6 | 7 | 8 | 9 |
|---|---|---|---|---|---|---|---|---|---|
| Maleinized butadiene polymer used (in Reference Example | | 1 | 6 | 2 | 3 | 4 | 19 | 20 | 24-1 |
| Amount of materials used | Maleinized polybutadiene (g) | 30 | 30 | 45 | 30 | 50 | 30 | 30 | 30 |
| | 28% ammonia water (ml) | 7 | 10 | 10 | 10 | 10 | 7 | 10 | 10 |
| | Water (ml) | 100 | 100 | 105 | 100 | 110 | 105 | 100 | 110 |
| | Ammonium persulfate (mg) | 200 | 200 | 100 | 200 | 200 | — | — | — |
| | Potassium persulfate (mg) | — | — | — | — | — | — | 100 | 100 |
| | α,α'-azobisisobutyronitrile (mg) | — | — | — | — | — | 200 | — | — |
| | Butyl methacrylate (g) | 71.5 | 71.5 | 71.5 | 71.5 | 71.5 | 71.5 | 71.5 | 71.5 |
| | Cobalt naphthate (g) | 0.5 | 0.5 | 0.5 | 0.5 | 0.5 | 0.5 | 0.2 | 0.2 |
| | Lead naphthate (g) | 2 | 2 | 1 | 2 | 2 | — | 2 | 2 |
| Polymerization conditions | Temperature (°C) | 70-85 | 60-75 | 53-70 | 80-90 | 70-80 | 60-70 | 60-70 | 65-75 |
| | Time (hr) | 2 | 2 | 2 | 3 | 2 | 2 | 3 | 3 |
| Properties | Solid content (wt.%) | 47.5 | 47.3 | 45.3 | 44.8 | 48.1 | 45.0 | 46.1 | 42.0 |
| | Particle size (μ) | 0.14-0.16 | 0.08-0.10 | 0.28-0.34 | 0.14-0.20 | 0.32-0.40 | 0.23-0.27 | 0.06-0.08 | <0.05 |
| | Acid value | 24.6 | 29.3 | 24.6 | 28.1 | 18.3 | 22.0 | 38.3 | 30.8 |

Table 5

| Example Nos. | 10 | 11 | 12 | 13 | 14 | 15 | 16 | 17 | 18 | 19 | 20 |
|---|---|---|---|---|---|---|---|---|---|---|---|
| Maleinized butadiene polymer used (in Reference Example Nos.) | 7 | 8 | 8 | 9 | 13 | 14 | 15 | 22 | 24-1 | 24-2 | 25 |
| Amount of materials used — Maleinized butadiene polymer (g) | 30 | 34 | 20 | 30 | 30 | 20 | 30 | 20 | 30 | 40 | 30 |
| 28% ammonia water (ml) | 10 | 5 | 5 | 10 | 10 | 10 | 20 | 10 | 10 | 10 | 10 |
| Water (ml) | 100 | 100 | 100 | 100 | 100 | 100 | 100 | 100 | 100 | 110 | 100 |
| Ammonium persulfate (mg) | 100 | 100 | – | – | – | – | – | – | – | – | – |
| Potassium persulfate (mg) | – | – | 50 | 100 | 100 | 100 | 100 | 100 | 100 | 100 | 100 |
| Butyl methacrylate (g) | 71.5 | 44.2 | 89.5 | 71.5 | 80.5 | 80.5 | 71.5 | 71.5 | 71.5 | 71.5 | 71.5 |
| Polymerization conditions — Temperature (°C) | 58–65 | 70–80 | 45–55 | 55–65 | 55–65 | 55–65 | 55–65 | 65–75 | 65–75 | 65–75 | 65–75 |
| Time (hr) | 1 | 2 | 2 | 2 | 2 | 2 | 2 | 2 | 2 | 2 | 2 |
| Properties — Solid content (wt. %) | 45.0 | 36.0 | 47.6 | 45.8 | 47.7 | 45.5 | 44.2 | 44.0 | 44.5 | 45.0 | 47.0 |
| Particle size (μ) | 0.16–0.18 | 0.35–0.45 | 0.45–0.50 | 0.11–0.13 | 0.37–0.43 | 0.19–0.21 | 0.40–0.48 | 0.31–0.38 | 0.30–0.40 | 0.55–0.60 | 0.45–0.55 |
| Acid value | 18.5 | 98.5 | 37.1 | 29.3 | 37.9 | 27.4 | 37.6 | 33.1 | 31.0 | 26.6 | 44.7 |

In Example 19 polymerization reaction was conducted by further adding 5 ml of butylcellosolve to the system.

From polymer emulsions of these Examples were obtained transparent and hard coatings respectively.

Water resistance of the coatings obtained from the emulsions of Examples 10, 16, 18 and 19 was extremely excellent. Particularly, the coatings of Examples 18 and 19 showed no change in 20 hours in water drop test conducted on the coating films one day after coating.

EXAMPLES 21 TO 23

Polymer emulsions were prepared in the same manner as in Example 1 except that the polymerization was conducted under the conditions shown in Table 6 below.

Table 6

| Example Nos. | 21 | 22 | 23 |
|---|---|---|---|
| Maleinized butadiene polymer used (in Reference Ex. Nos.) | 20 | 20 | 20 |
| Amount of materials used — Maleinized butadiene polymer (g) | 20 | 30 | 50 |
| 28% ammonia water (ml) | 5 | 10 | 15 |
| Water (ml) | 100 | 100 | 120 |
| Potassium persulfate (mg) | 100 | 100 | 100 |
| Butyl methacrylate (g) | 71.5 | 71.5 | 71.5 |
| Polymerization conditions — Temperature (°C) | 65–75 | 60–70 | 65–70 |
| Time (hr) | 2 | 2 | 2 |
| Properties — Solid content (wt. %) | 45.0 | 46.0 | 44.2 |
| Particle size (u) | 0.07–0.08 | 0.15–0.16 | 0.30–0.36 |
| Acid value | 28.0 | 38.7 | 54.5 |

EXAMPLES 24 TO 26

Polymer emulsions were prepared in the same manner as in Example 1 except that the polymerization was conducted under the conditions shown in Table 7 below.

Table 7

| Example Nos. | | 24 | 25 | 26 |
|---|---|---|---|---|
| Maleinized butadiene polymer used (in Reference Ex. Nos.) | | 25 | 26 | 27 |
| Amount of materials used | Maleinized butadiene polymer (g) | 30 | 30 | 30 |
| | Trimethyl amine (30 wt.% aq.soln.)(ml) | 20 | 15 | 15 |
| | Water (ml) | 100 | 100 | 100 |
| | Potassium persulfate (mg) | 100 | 100 | 100 |
| | Butyl methacrylate (g) | 71.5 | 71.5 | 71.5 |
| | Cobalt naphthenate (8%) (g) | 2 | 2 | 2 |
| Polymerization conditions | Temperature (°C) | 70-85 | 70-80 | 60-70 |
| | Time (hr) | 2 | 2 | 2 |
| Properties | Solid content (wt.%) | 46.0 | 44.5 | 46.0 |
| | Particle size ($\mu$) | 0.10-0.20 | 0.06-0.08 | 0.05-0.10 |
| | Acid value | 44.3 | 31.2 | 49.2 |

EXAMPLES 27 TO 35

Polymer emulsions were prepared in the same manner as in Example 1 using various vinyl monomers shown in Table 8 below. The polymerization conditions are also shown in Table 8.

Table 8

| | Example Nos. | 27 | 28 | 29 | 30 | 31 | 32 | 33 | 34 | 35 |
|---|---|---|---|---|---|---|---|---|---|---|
| Maleinized butadiene polymer used (in Reference Ex. Nos.) | | 3 | 7 | 10 | 11 | 20 | 21 | 23 | 23 | 23 |
| Amount of materials used | Maleinized butadiene polymer (g) | 20 | 30 | 30 | 40 | 30 | 25 | 200 | 72 | 30 |
| | 28% ammonia water (ml) | 7 | 10 | 10 | 10 | 10 | 10 | 66 | 24 | 10 |
| | Water (ml) | 100 | 100 | 110 | 100 | 100 | 100 | 737 | 240 | 110 |
| | Ammonium persulfate (mg) | 200 | — | 300 | — | — | — | 3000 | 500 | 500 |
| | Potassium persulfate (mg) | — | 50 | — | 100 | 100 | 200 | — | — | — |
| Vinyl monomers & amounts | Acrylic acid (g) | — | — | 0.3 | — | — | — | — | — | — |
| | Ethyl acrylate (g) | — | — | 27 | — | — | — | — | — | — |
| | Butyl acrylate (g) | — | — | — | 25.2 | — | — | — | — | — |
| | 2-ethylhexyl acrylate (g) | — | — | — | — | — | — | — | 63 | — |
| | Methyl methacrylate (g) | — | — | — | — | — | — | 220 | 7.2 | — |
| | Ethyl methacrylate (g) | — | 8.2 | — | — | — | — | — | — | — |
| | Butyl methacrylate (g) | 67.2 | — | — | — | — | — | — | — | — |
| | Lauryl methacrylate (g) | — | — | — | — | — | — | 220 | — | — |
| | Acrylamide (g) | 5 | — | — | — | — | — | — | — | — |
| | Acrylonitrile (g) | — | — | 3 | — | — | — | — | — | — |
| | Styrene (g) | — | — | 28 | 38.2 | 72 | 72 | — | — | — |
| | Vinyltoluene (g) | — | — | — | — | — | — | — | — | 30 |

Table 8—Continued

| | Example Nos. | 27 | 28 | 29 | 30 | 31 | 32 | 33 | 34 | 35 |
|---|---|---|---|---|---|---|---|---|---|---|
| Maleinized butadiene polymer used (in Reference Ex. Nos.) | | 3 | 7 | 10 | 11 | 20 | 21 | 23 | 23 | 23 |
| | Isoprene (g) | — | — | — | — | — | — | — | — | 30 |
| | Glycidyl methacrylate (g) | — | — | — | — | — | — | — | 5 | — |
| Polymerization conditions | Temperature (°C) | 50–56 | 65–70 | 75–85 | 50–70 | 60–70 | 70–80 | 70–80 | 56–75 | 70–85 |
| | Time (hr) | 2 | 2 | 3 | 1 | 2 | 20 (min.) | 6 | 2 | 5 |
| Properties | Solid content (wt. %) | 43.0 | 47.0 | 38.0 | 47.0 | 45.5 | 42.0 | 41.0 | 40.0 | 34.0 |
| | Particle size (μ) | 0.48–0.50 | 0.11–0.13 | 0.30–0.35 | 0.18–0.22 | <0.05 | 0.50–0.60 | 0.50–0.60 | 0.60–0.70 | 0.60–0.70 |
| | Acid value | 20.2 | 33.7 | — | 34.8 | 38.0 | 48.4 | 52.0 | 57.0 | 56.0 |

In Examples 33 and 34 pressure reducing operation was not conducted prior to the polymerization reaction and in Examples 29 and 35 pressure reducing operation was shortened by 5 minutes. After the reaction excess ammonia was removed by an evaporator in Examples 29, 33 and 34, and in Example 35 excess ammonia and unreacted isoprene were removed.

EXAMPLES 36 TO 41

Polymer emulsions were prepared in the same manner as in Example 1, using various neutralizing agents shown in Table 9. The reaction conditions are also shown in Table 9.

Table 9

| | | Example Nos. | 36 | 37 | 38 | 39 | 40 | 41 |
|---|---|---|---|---|---|---|---|---|
| Maleinized butadiene polymer used (in Reference Ex. Nos.) | | | 5 | 6 | 6 | 7 | 20 | 24-1 |
| Amount of materials used | | Maleinized butadiene polymer (g) | 30 | 30 | 40 | 30 | 30 | 30 |
| | | Water (ml) | 120 | 100 | 110 | 100 | 100 | 120 |
| | | Potassium persulfate (mg) | 100 | 100 | 100 | 100 | 100 | 100 |
| | | Styrene (g) | — | 40 | 43.6 | 40 | — | — |
| | | Butyl acrylate (g) | — | 32.4 | 28.8 | 32.4 | — | — |
| | | Butyl methacrylate (g) | 62.7 | — | — | — | 71.5 | 71.5 |
| | Neutralizing agent | Trimethyl amine (30 wt. % aq. soln.) (ml) | 10 | — | — | — | 15 | — |
| | | Triethyl amine (ml) | — | 4.5 | — | — | — | — |
| | | Ethyl amine (70 wt.% aq. soln) (ml) | — | — | 6 | — | — | — |
| | | NaOH (g) | — | — | — | 2.5 | — | — |
| | | KOH (g) | — | — | — | — | — | 3.0 |
| Polymerization conditions | | Temperature (°C) | 55–66 | 60–75 | 60–70 | 75–85 | 70–80 | 70–80 |
| | | Time (hr) | 2 | 2 | 2 | 2 | 2 | 2 |
| Properties | | Solid content (wt.%) | 37.4 | 47.9 | 46.0 | 48.5 | 44.0 | 43.0 |
| | | Particle size (μ) | 0.43–0.48 | 0.38–0.46 | 0.11–0.13 | 0.20–0.22 | 0.12–0.14 | >0.60 |
| | | Acid value | 19.8 | 29.3 | 35.9 | 27.1 | 36.4 | 31.0 |

EXAMPLES 42 TO 47

Polymer emulsions were prepared in the same manner as in Example 1, using various radical initiators shown in Table 10 below, provided that in Examples 44 and 47 polymerization was conducted in a stationary state in glass vessel after the starting mixture was thoroughly stirred. In Example 44 the polymerization was carried out at room temperature and in Example 47 in the glass vessel placed in ice water. The polymerization conditions are also shown in Table 10.

Table 10

| Example Nos. | | | 42 | 43 | 44 | 45 | 46 | 47 |
|---|---|---|---|---|---|---|---|---|
| Maleinized butadiene polymer used (in Reference Ex. Nos.) | | | 12 | 11/12 | 13 | 19 | 19 | 20 |
| Amount of materials used | | Maleinized butadiene polymer (g) | 40 | 20/20 | 4 | 30 | 30 | 30 |
| | | 28% ammonia water (ml) | 10 | 20 | 1 | 7 | 8 | 7 |
| | | Water (ml) | 100 | 100 | 12 | 100 | 100 | 100 |
| | | Butyl cellosolve (ml) | 10 | — | — | — | — | — |
| | | Methyl cellosolve (ml) | — | 20 | — | — | — | — |
| | | Butyl methacrylate (g) | 71.5 | 62.7 | 7.2 | 71.5 | 71.5 | 71.5 |
| | Initiators | Potassium persulfate (mg) | — | — | — | — | 100 | — |
| | | $FeCl_3$ | 0.16 | — | — | — | — | — |
| | | 30% hydrogen peroxide (ml) | 1.0 | — | — | — | — | — |
| | | $\alpha,\alpha'$-azobisisobutyl nitrile (mg) | — | 100 | — | 200 | — | — |
| | | $\gamma$-rays (r/hr) | — | — | $2.5 \times 10^4$ | — | — | $2.5 \times 10^4$ |
| Polymerization conditions | | Temperature (°C) | 50–65 | 70–80 | Room Temp. | 70–80 | 55–65 | 0 |
| | | Time (hr) | 2 | 2 | 10 | 2 | 2 | 4 |
| Properties | | Solid content (wt. %) | 45.5 | 40.9 | 42.2 | 45.0 | 45.0 | 45.0 |
| | | Particle size ($\mu$) | 0.24–0.28 | 0.20–0.25 | 0.36–0.42 | 0.28–0.35 | 0.23–0.28 | <0.05 |
| | | Acid value | 45.0 | 41.7 | 50.7 | 22.0 | 22.0 | 38.0 |

EXAMPLES 48 TO 50

Polymer emulsions were prepared in the same manner as in Example 1, except that the polymerization was conducted under the conditions shown in Table 11 below.

Table 11

| Example Nos. | | 48 | 49 | 50 |
|---|---|---|---|---|
| Maleinized butadiene polymer used (in Reference Ex. Nos.) | | 16 | 17 | 18 |
| Amount of materials used | Maleinized butadiene polymer (g) | 60 | * | 50 |
| | 28% ammonia water (ml) | 10 | 10 | 10 |
| | Water (ml) | 80 | 105 | 110 |
| | Butyl cellosolve (g) | — | — | 10 |
| | Butyl methacrylate (mg) | 71.5 | 71.5 | 62.7 |
| | Ammonium persulfate (g) | 200 | 200 | 200 |
| | Cobalt naphthenate (g) | 0.5 | 0.5 | — |
| | Lead naphthenate (g) | 2.0 | 2.0 | — |
| Polymerization conditions | Temperature (°C) | 65–75 | 60–70 | 60–70 |
| | Time (hr) | 2 | 2 | 2 |

Table 11—Continued

| Example Nos. | | 48 | 49 | 50 |
|---|---|---|---|---|
| Maleinized butadiene polymer used (in Reference Ex. Nos.) | | 16 | 17 | 18 |
| Properties | Solid content (wt.%) | 42.9 | 43.4 | 34.0 |
| | Particle size (μ) | 0.18–0.22 | 0.28–0.32 | 0.12–0.14 |
| | Acid value | 28.6 | 29.3 | 31.7 |

Note: * Whole amount of the product obtained in Reference Example 17 was used.

EXAMPLE 51

In an autoclave were placed 30 g of maleinized polybutadiene obtained in Reference Example 3, 100 ml of water, 7 ml of 28% ammonia water, 71.5 g of butyl methacrylate, 0.2 g of cobalt naphthenate, 0.3 ml of 30 wt. % hydrogen peroxide solution and 0.08 g of ferrous chloride. The air in the autoclave was replaced with nitrogen gas and the mixture was stirred at 20°C for 4 hours for polymerization. During the stirring the temperature of system was increased up to 37°C. Solid concentration of the resultant polymer emulsion was 45.5% and particle size of the polymer was 0.12 to 0.16 μ. The theoretical acid value relative to the total solids of the emulsion was 28.0.

The polymer emulsion thus obtained was applied to glass plate and dried at room temperature for one week. The resultant coating film had a pencile hardness of F and showed no change in 3.5 hours' water drop test.

Each polymer emulsion obtained in Examples 10 to 50 was applied to glass plate and dried at room temperature. Thus it was found that each polymer emulsion in these Examples except in Examples 28, 31, 32 and 38 gave a transparent and hard coating film. The coatings of Examples 28, 31, 32 and 38 were cured at an elevated temperature less than 100°C to give a transparent and hard film.

To the polymer emulsions obtained in Examples 1 to 9, 18 to 19, 21 to 26, 37, 40 and 45 to 49 was added 25 wt. % of titanium white of rutile structure, based on the solid weight in the emulsion and the mixture was thoroughly stirred to produce paint.

The paint was applied to a glass plate and dried at room temperature. The gloss, hardness and water resistance of the coating film were measured by the following methods, with the results shown in Table 12 below. In Table 12 the properties of the coating film obtained in the same manner as above from commercial acryl polymer emulsion are also shown for comparative purpose.

| | |
|---|---|
| Specular gloss: | ASTM D523-62T, 60° |
| Hardness: | Pencile hardness was measured on each coating film dried for a predetermined period shown in Table 12. |
| Water resistance: | On the coating film dried for a predetermined period shown in Table 12 was placed water drop and the film was left to stand at a relative humidity of 100%. Water resistance was shown in terms of the time taken for generation of blister on the coating. |

Table 12

| Ex. Nos. | Gloss (60°) | 1 day Hardness | 1 day Water resistance | 2 days Hardness | 2 days Water resistance | 3 days Hardness | 3 days Water resistance | 7 days Hardness | 7 days Water resistance |
|---|---|---|---|---|---|---|---|---|---|
| 1 | 63 | 4B | 4 hrs. 30 min. | HB | 12 hrs. | HB | 20 hrs. | F | 24 hrs. |
| 2 | 59 | 3B | 5 hrs. 10 min. | HB | >10 hrs. | HB | >24 hrs. | F | > 2 days |
| 3 | 74 | <6B | 1 hr. 50 min. | 3B | 4 hrs. 30 min. | B | > 6 hrs. | HB | > 9 hrs. |
| 4 | 61 | 2B | 4 hrs. | HB | >10 hrs. | HB | >24 hrs. | F | >24 hrs. |
| 5 | 73 | 3B | 30 min. | B | 1 hr. 30 min. | HB | 2 hrs. | F | 3 hrs. 30 min. |
| 6 | 63 | 6B | >12 hrs. | B | >24 hrs. | HB | > 4 days | B | > 6 days |
| 7 | 66 | 3B | >24 hrs. | 3B | — | 3B | — | 2B | — |
| 8 | 75 | <6B | 20 hrs. | 4B | — | 4B | — | 2B | — |
| 9 | 88 | 3B | >24 hrs. | 2B | — | 2B | — | B | — |
| 18 | 70 | 2B | >24 hrs. | B | — | B | — | B | — |
| 19 | 60 | 3B | >24 hrs. | B | — | B | — | B | — |
| 21 | 88 | 3B | >24 hrs. | 3B | — | 3B | — | 2B | — |
| 22 | 78 | 4B | >24 hrs. | 3B | — | 3B | — | 3B | — |
| 23 | 73 | 3B | 20 hrs. | 3B | — | 3B | — | 3B | — |
| 24 | 80 | — | — | — | — | B | — | B | — |
| 25 | 75 | — | — | — | — | 2B | — | 2B | — |
| 26 | 73 | — | — | — | — | B | — | HB | — |
| 37 | 72 | 3B | 10 min. | 2B | 17 min. | HB | 35 min. | HB | 2 hrs. |
| 40 | 79 | 4B | 10 hrs. | 4B | — | 4B | — | 3B | — |
| 45 | 73 | 3B | >24 hrs. | 3B | — | 3B | — | 3B | — |
| 46 | 69 | 3B | >24 hrs. | 3B | — | 3B | — | 3B | — |
| 47 | 75 | 3B | >24 hrs. | 3B | — | 3B | — | 3B | — |
| 48 | 78 | 4B | 12 min. | B | 41 min. | HB | 2 hrs. | HB | 3 hrs. 30 min. |
| 49 | 72 | 6B | 3 hrs. | 2B | 7 hrs. | B | >15 hrs. | HB | >24 hrs. |
| Comparison | 51 | 3B | 7 min. | 3B | 7 min. | 3B | 14 min. | 3B | 40 min. |

What we claimed is:

1. In polymerizing in an aqueous medium in the presence of an emulsifying agent a vinyl monomer having a Q value of at least 0.1 determined by Q-e scheme to produce an aqueous emulsion of a vinyl polymer, a method wherein said emulsifying agent is an addition product, having an acid number of 20 to 350, neutralized with a base, of a butadiene polymer having a number average molecular weight of 200 to 40,000 and at least one of maleic acid and maleic anhydride, said addition product being used in an amount such that the theoretical acid number relative to the total solids contained in the resultant polymer solution is in the range of 5 to 150.

2. The method according to claim 1, in which said addition product is added to the polymerization system in the range of from 15 to 120 in terms of theoretical acid value relative to the total solids contained in the resultant polymer emulsion.